United States Patent [19]

Wolfinger

[11] 4,148,222
[45] Apr. 10, 1979

[54] APPARATUS AND METHOD FOR MEASURING TORSIONAL VIBRATION

[75] Inventor: John F. Wolfinger, Schenectady, N.Y.

[73] Assignee: General Electric Company, Schenectady, N.Y.

[21] Appl. No.: 863,153

[22] Filed: Dec. 22, 1977

[51] Int. Cl.² .............................................. G01H 1/10
[52] U.S. Cl. .................................................... 73/650
[58] Field of Search ................... 73/650; 324/161, 166, 324/173, 175

[56] References Cited

U.S. PATENT DOCUMENTS

| | | | |
|---|---|---|---|
| 2,610,505 | 9/1952 | Hope | 73/650 |
| 2,655,036 | 10/1953 | Chapman | 73/650 |
| 3,808,560 | 4/1974 | Gassmann | 324/173 |
| 3,885,420 | 5/1975 | Wolfinger | 73/650 |

*Primary Examiner*—Charles A. Ruehl
*Attorney, Agent, or Firm*—John F. Ahern; James W. Mitchell

[57] ABSTRACT

A method and apparatus are provided for measuring torsional vibrations of a rotating member by sensing passage of a plurality of circumferentially spaced elements adapted for movement with the member and for producing an electrical signal including true components representing the torsional vibrations and from which selected false components representing inhomogeneities in the elements have been eliminated.

9 Claims, 2 Drawing Figures

APPARATUS AND METHOD FOR MEASURING TORSIONAL VIBRATION

BACKGROUND OF THE INVENTION

1. Field of the Invention

This invention relates to an apparatus and a method for measuring vibrations and in particular to such apparatus and method for measuring torsional vibrations of a rotating shaft.

2. Description of the Prior Art

In large machines having a rotating shaft which may weigh several tons, very small torsional vibrations in the shaft will cause stresses which may damage the shaft and in some instances result in shaft breakage and destruction of the machine. Such vibrations may be of magnitudes as small as 0.01°. A device capable of detecting and measuring such small vibrations has been disclosed in U.S. Pat. No. 3,885,420.

An embodiment of the measuring apparatus disclosed in the above-mentioned patent comprises a gear adapted for rotation with a shaft, a magnetic probe for producing an electrical signal in response to movement of the gear teeth past the probe and a detection circuit. The signal is applied to the detection circuit which produces first and second pulse trains representing the instantaneous and average angular velocities of the shaft, respectively. The detection circuit also compares the phase of each pulse in the first pulse train to the phase of a corresponding pulse in the second pulse train. Any instantaneous change in the angular position of the shaft from a uniformly increasing value will result in a change in the phase relationship between the corresponding pulses and the detection circuit will produce an output signal representing the amplitude and frequency of torsional vibrations in the shaft.

Although the apparatus disclosed in the above-mentioned patent is highly sensitive to small torsional vibrations, it is not usable for the measurement of vibrations at certain frequencies. Specifically, it cannot be utilized to measure vibrations occurring at frequencies which are multiples of the cyclic rate of rotation of the shaft (shaft speed). At these frequencies, the output signal includes false components which cannot be distinguished from true components representing actual shaft vibrations. These false components are caused by inhomogeneities in the gear in the form of irregular spacing between the teeth or differences in the metallurgical compositions of the teeth.

It is the primary object of the present invention to provide torsional vibration measuring apparatus of the above-described type which has the additional capability of unambiguously measuring such vibrations occurring at frequencies which are multiples of the shaft speed.

SUMMARY OF THE INVENTION

Measurement of torsional vibrations occurring at multiples of shaft speed is accomplished by making use of the basic principle that at any instant an inhomogeneity in an element attached to a rotating member can be detected only at the particular location of the inhomogeneity, but a torsional vibration of the member can be detected at any location around the circumference of the member. It has been found that by utilizing an additional probe, appropriately located with respect to the single probe normally used, and an additional detection circuit, false components of selected frequencies can be eliminated from the output signal of a vibration measurement apparatus, thus allowing unambiguous measurement of the actual vibrations occurring at these frequencies. Elimination is accomplished by separating the two probes by an appropriate angle to effect placing selected frequencies of false components of the output signals produced by the two detection circuits 180° out-of-phase. False components of these selected frequencies can then be eliminated by electrical summation of the output signals.

DESCRIPTION OF THE PREFERRED EMBODIMENT

Figure 1:
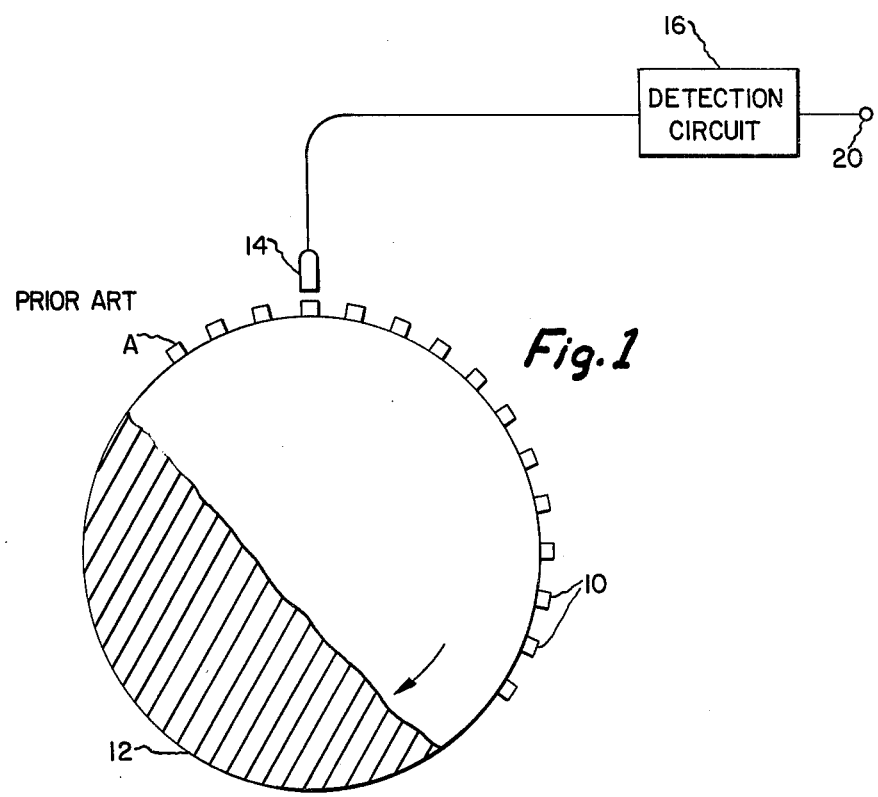
FIG. 1 is a schematic illustration of a typical prior art apparatus for measuring torsional vibrations of a rotating member.

FIG. 1 illustrates a prior art apparatus, capable of measuring small torsional vibrations. The apparatus includes a plurality of circumferentially spaced elements 10 provided around the periphery of a rotating member 12. Typically, the rotating member is a large shaft and the elements are the teeth of a gear concentrically attached to the shaft. Alternatively, the elements might be stripes having different light reflectivity than the shaft or any other type of elements which are adaptable for movement with a rotating member and have detectable characteristics. A probe 14 is mounted adjacent the elements for sensing passage of the elements. Typically, this probe is a magnetic pick-up capable of sensing the passage of metallic gear teeth, or a photoresponsive device capable of sensing the passage of light reflecting stripes. The probe 14 produces an electrical signal representative of the sensed passage of the elements and this signal is applied to a detection circuit 16.

The detection circuit operates on the applied signal in a manner such as that described in U.S. Pat. No. 3,885,420 and produces an output signal, delivered to a terminal 20, representing variations in the sensed passage of the elements. This output signal includes components having frequencies and magnitudes representative of the frequencies and magnitudes of torsional vibrations occurring in the member, and may be monitored at terminal 20 for diagnostic purposes or to give advanced warning of vibrations which might have a destructive effect. Unfortunately, the high sensitivity of the apparatus which provides the capability of measuring very small torsional vibrations in the rotating member also effects sensing of small inhomogeneities in the circumferentially spaced elements passing the probe. The detection circuit cannot distinguish between variations in the electrical signal from the probe caused by actual vibrations and variations caused by inhomogeneities in the passing elements. Thus, the detection circuit output signal includes not only true components representing actual torsional vibrations of the rotating member, but also false components representing inhomogeneities in the elements.

In order to better understand the problems presented by this inability to distinguish between true and false components of the output signal, it is helpful to consider an example. In a typical situation member 12 is a turbine shaft rotating at a speed of 3600 rpm. Elements 10 are gear teeth attached to the shaft which include inhomogeneities, for example, tooth A may have a slight imperfection causing probe 14 to sense its passage slightly later than it would a perfect tooth. Since tooth A passes the probe sixty times per second, the output signal at terminal 20 includes a false component of 60 hertz indicating a variation in the angular velocity of the rotating member occurring at a rate of sixty times per second. Other false components also appear at harmonic frequencies which are multiples of 60 hertz, namely, at 120, 180, 240 . . . hertz. These false components and the false components caused by all other inhomogeneities in the gear teeth are indistinguishable from true components representing actual torsional vibrations occurring in the rotating member at these same frequencies. Thus, the prior art apparatus is unusable for measurement of torsional vibrations occurring at frequencies which are multiples of the cyclic rate of rotation of the member. Although filtering may be utilized to eliminate components occurring at these frequencies, such filtering will also eliminate not only the false components, but also any true components occurring at frequencies which are multiples of the rate of rotation of the member.

Figure 2:
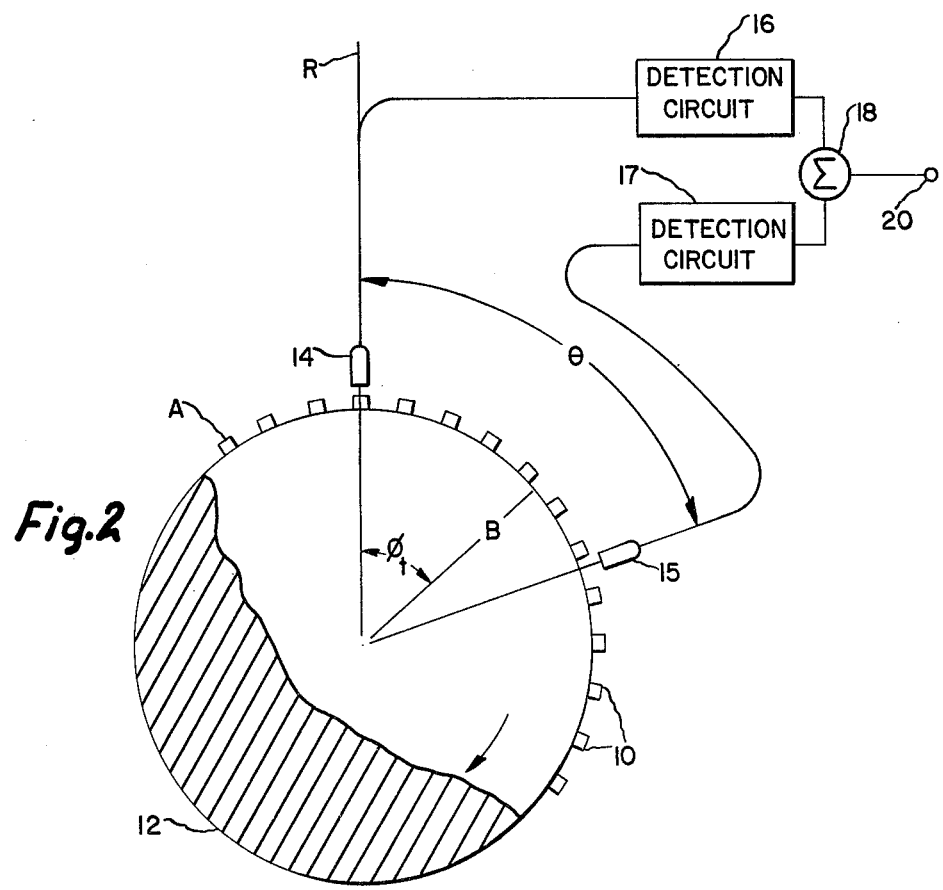
FIG. 2 is a schematic illustration of an embodiment of the present invention for measuring torsional vibrations of a rotating member.

It has been found that by constructing a torsional vibration measuring apparatus incorporating a second probe, located adjacent the elements and separated from a first probe by a predetermined angle, and a second detection circuit, false components of selected frequencies can be eliminated without eliminating any true components. Such an apparatus is illustrated in FIG. 2 wherein a second probe 15 and a second detection circuit 17, identical to a first probe 14 and first detection circuit 16, respectively, of the type utilized in the prior art embodiment of FIG. 1, are included. Incorporating the second probe enables the apparatus to discriminate between torsional vibrations of the rotating member and inhomogeneities in the passing elements. Such discrimination is possible since, at any instant, a torsional vibration can be sensed at any location around the circumference of the member, but an inhomogeneity in an element attached to the rotating member can be sensed only at the particular location of the inhomogeneity. In other words, the torsional vibration will be sensed simultaneously at the two probes, but the inhomogeneity will be sensed sequentially at the two probes. Because of sequential sensing of inhomogeneities, the second detection circuit (receiving an electrical signal from the second probe) will produce an output signal including false components which are out-of-phase with the false components of the output signal produced by the first detection circuit. The magnitude of the phase difference between corresponding false components produced by the two detectors is dependent upon the frequency of the false components and the angle of separation of the two probes. As will be developed in the following paragraphs, corresponding false components of selected frequencies may be placed 180° out-of-phase and eliminated by electrical summation by appropriate choice of the separation angle $\theta$. As illustrated in FIG. 2, summation means 18 is provided in the preferred embodiment of the invention to average the output signals from the first and second detection circuits (16, 17). The summation circuit produces an output signal, delivered to a terminal 20, containing no false components at the selected frequencies.

The relationship between the angle $\theta$ and the frequencies at which false components are eliminated may be developed by referring to FIG. 2. If a reference mark B is placed on a member 12 rotating with an angular velocity $\omega_o$, upon which is superimposed a torsional vibration $\phi_s(t)$, the instantaneous angular position of B relative to a reference line R can be expressed as:

$$\phi(t) = \omega_o t + \phi_s(t) \qquad (1)$$

If the elements 10 attached to the member 12 are perfectly uniform probe 14 will produce an electrical signal of the form $\sin \phi_c(t)$ where $\phi_c(t)$ is related to $\phi(t)$ by the number (N) of elements 10:

$$\phi_c(t) = N\phi(t) \qquad (2)$$

If the elements 10 are not perfectly uniform the angle $\phi(t)$ will appear to be modified by a noise component $\phi_f(t)$ and the electrical signal produced by probe 14 will be of the form $\sin \phi_c(t)$ where:

$$\phi_c(t) = N[\phi(t) + \phi_f(t)] \qquad (3)$$

The noise component is periodic, however, repeating every time the member makes a revolution or, what is the same, every time $\phi(t)$ increases by $2\pi$. Because of this periodicity $\phi_f(t)$ can be expressed as a Fourier series with $\phi(t)$ as the argument:

$$\phi_f(t) = \sum_{1}^{\infty} a_n \sin(n\phi(t) + \beta_n) \qquad (4)$$

where the values of $a_n$ and $\beta_n$ depend upon the particular form of the noise signal. Combining equations we can write:

$$\phi_c(t) = N[\omega_o t + \phi_s(t)] + \qquad (5)$$

$$N \sum_{1}^{\infty} a_n \sin[n\omega_o t + n\phi_s(t) + \beta_n]$$

Equation (5) is representative of the electrical signal produced by probe 14 and applied to detection circuit 16.

The detection circuit 16 includes a phase-locked loop having a local oscillator tuned to the frequency $Nf_o$, where $f_o$ is the average cyclic rate of rotation of the member 12. The signal produced by the local oscillator may be expressed by $\sin \phi_{osc}(t)$ where:

$$\phi_{osc}(t) = N2\pi f_o t = N\omega_o t \qquad (6)$$

The output signal from the detection circuit 16 is representative of the difference between the phase of the electrical signal produced by probe 14 and the phase of the signal produced by the local oscillator:

$$\Delta\phi(t) = \phi_c(t) - \phi_{osc}(t) \qquad (7)$$

$$= N[\phi_s(t)] + N \sum_{1}^{\infty} a_n \sin[n\omega_o t + n\phi_s(t) + \beta_n]$$

A torsional vibration $\phi_s(t)$ occurring at a frequency which is an integral multiple m of frequency $f_o$ might be expressed:

$$\phi_s(t) = \phi_s \sin(m\omega_o t) \qquad (8)$$

Equation (7) can then be rewritten:

$$\Delta\phi(t) = N[\phi_s \sin(m\omega_o t)] \qquad (9)$$

-continued $$+ N \sum_1^\infty a_n \sin[n\omega_o t + n\phi_s \sin(m\omega_o t) + \beta_n]$$

$$= N[\phi_s \sin(m\omega_o t)]$$

$$+ N \sum_1^\infty a_n [\sin(n\omega_o t + \beta_n) \cos(n\phi_s \sin(m\omega_o t))$$

$$+ \cos(n\omega_o t + \beta_n) \sin(n\phi_s \sin(m\omega_o t))]$$

The terms in the summation for which $n=m$ represent the false components of the output signal produced by detection circuit 16 which have the same frequency as the true component representing the torsional vibration $\phi_s(t)$ expressed in equation (8).

Now consider the electric signal produced by probe 15 separated from probe 14 by angle $\theta$. This signal will be similar to that produced by probe 14, but all components other than $\phi_s(t)$ will be phase shifted by angle $\theta$. $\phi_s(t)$ is not phase shifted because the vibration it represents is sensed simultaneously by both probes. The signal produced by probe 15 may be expressed by an equation similar to (5):

$$\phi_o(t) = N[\omega_o t + \phi_s(t) - \theta] \qquad (10)$$

$$+ N \sum_1^\infty a_n \sin[n\omega_o t + n\phi_s t - n\theta + \beta_n]$$

The detection circuit 17 includes a phase-locked loop having a local oscillator tuned to the frequency $Nf_o$, but the signal produced by the local oscillator is phase-shifted from that produced by the local oscillator of detection circuit 16 by $N\theta$:

$$\phi'_{osc}(t) = N\omega_o t - N\theta \qquad (11)$$

The output signal from the detection circuit 17 represents the difference between the phase of the electrical signal produced by probe 15 and the phase of the signal produced by the local oscillator:

$$\Delta\phi'(t) = \phi_o' - \phi_{osc}'(t) \qquad (12)$$

$$= N\phi_s(t) + N \sum_1^\infty a_n \sin[n\omega_o t + n\phi_s(t)$$

$$- n\theta + \beta_n]$$

$$= N\phi_s(t) + N \sum_1^\infty a_n [\sin(n\omega_o t + n\phi_s(t)$$

$$+ \beta_n) \cos n\theta - \cos(n\omega_o t + n\phi_s(t)$$

$$+ \beta_n) \sin n\theta]$$

The summation circuit 18 electrically averages the output signals from detection circuits 16 and 17 to produce the output signal appearing at terminal 20:

$$\frac{\Delta\phi(t) + \Delta\phi'(t)}{2} = N\phi_s(t) + \qquad (13)$$

$$\frac{N}{2} \sum_1^\infty a_n [\sin(n\omega_o t + n\phi_s(t) + \beta_n))(1 + \cos n\theta) -$$

$$\cos(n\omega_o t + n\phi_s(t) + \beta_n) \sin n\theta]$$

For particular values of n, designed $n_m$, terms in the summation in equation (13) can be made to reduce to zero. These values are determined by equating $n_m\theta$ to odd multiples of $\pi$:

$$n_m\theta = \pi(2m+1) \qquad (14)$$

$$n_m = \frac{\pi}{\theta}(2m+1) \qquad (15)$$

where m is an integer (0, 1, 2 . . .). The corresponding term in the summation reduces to zero for these values because $$1 + \cos n_m\theta = 1 + \cos \pi(2m+1) = 1-1 = 0$$

and $$\sin n_m\theta = \sin \pi(2m+1) = 0$$

Note that the last term of equation (13) includes all of the false components of the output signal appearing at terminal 20. Since $n\omega_o$ describes the frequencies of these components, the specific frequencies of the false signal components that are eliminated by separating probes 14 and 15 by angle $\theta$ can be determined by utilizing equation (15). If we designate the frequencies of the false components to be eliminated $f_m$ we may write:

$$f_m = n_m f_o \qquad (16)$$

The relationship between the frequencies eliminated and the separation of the probes is established by combining equations (15) and (16):

$$f_m = \frac{\pi}{\theta}(2m+1)f_o \qquad (17)$$

where the angle $\theta$ is expressed in radians.

Let us now return to the example of the turbine shaft rotating at a speed of 3600 rpm and assume that the shaft is subject to recurring torsional vibrations at a frequency of 120 hertz. Utilizing the apparatus illustrated in FIG. 2, these torsional vibrations can be unambiguously monitored at terminal 20, if the probes 14 and 15 are separated by an angle of 90°, or $\pi/2$ radians. From equation (17) it can be seen that for a separation of $\pi/2$ radians false components of frequencies that are two-times the odd multiples of $f_o$ are eliminated from the signal provided at terminal 20. Since $f_o$ is 60 hertz in our example, false components of frequencies 120, 360, 600 . . . hertz are eliminated and the true components representing the 120 hertz vibration can be monitored.

It can be seen from the above description that a significant improvement in the capabilities of existing apparatus and methods for measuring torsional vibrations of rotating members can be obtained by use of the present invention. This improvement is obtained without the need for complex modifications to existing apparatus and requires only the addition of a second probe appropriately spaced from the one normally used and summation of two signals of the type already produced by the existing apparatus.

Although a specific example describing use of the present invention to improve the capabilities of torsional vibration measurement apparatus such as that disclosed in U.S. Pat. No. 3,885,420 has been disclosed, it is not intended that the invention be restricted to such use. Rather, the apparatus and method of the present invention may be used in any manner obvious to one skilled in the art, subject only to the limitations imposed by the appended claims.

What I claim is:

1. Torsional vibration measuring apparatus comprising a plurality of circumferentially spaced elements adapted for movement with a rotating member, a probe located adjacent said rotating member for sensing passage of the elements and producing a first electrical signal representing the sensed passage of the elements and a detection circuit to which said electrical signal is applied for producing a first electrical output signal representing variations in the sensed passage of the elements, said first output signal including true components representing torsional vibrations of the rotating member and false components representing inhomogeneities in the elements, and means for eliminating false components of selected frequencies, said means including:

(a) a second probe located adjacent the elements and separated from a first probe by an angle $\theta$ (expressed in radians), said angle being determined in accordance with the relationship:

$$f_m = \frac{\pi}{\theta}(2m + 1)f_o$$

where:
$f_m$ = frequencies of false components to be eliminated;
$f_o$ = cyclic rate of rotation of the member;
m = an integer 0, 1, 2 . . . ;

(b) a second detection circuit for receiving a second electrical signal from the second probe and producing a second output signal including false components which are out-of-phase with false components of an output signal produced by said first detection circuit receiving the first electrical signal from the first probe; and (c) means for electrically summing the output signals from the first and second detection circuits to eliminate the false components of frequencies $f_m$.

2. Apparatus as in claim 1, wherein said rotating member is a turbine shaft.

3. Apparatus as in claim 1, wherein said circumferentially spaced elements are gear teeth and said probes are magnetic pick-up devices.

4. Apparatus as in claim 1 wherein said circumferentially spaced elements are comprised of stripes on the rotor and said probes are optical pick-up means responsive to the difference of surface characteristics of the rotor and the stripes thereon.

5. The apparatus of claim 1 wherein said false components are of an integral multiplier of said rate of rotation.

6. The apparatus of claim 5 wherein said integral multiplier is an odd multiple of an integer.

7. A method for measuring torsional vibrations of a rotating member by sensing passage of a plurality of circumferentially spaced elements adapted for movement with the member and by producing an electrical signal including true components representing the torsional vibrations and from which selected false components representing inhomogeneities in the elements have been eliminated, said method comprising the steps of:

(a) sensing passage of the elements with sensing means at two locations adjacent said elements, said locations being separated by an angle $\theta$ (expressed in radians), said angle being determined in accordance with the relationship:

$$f_m = \frac{\pi}{\theta}(2m + 1)f_o$$

where:
$f_m$ = frequencies of false components to be eliminated;
$f_o$ = cyclic rate of rotation of the member;
m = an integer 0, 1, 2, . . .

(b) producing first and second electrical signals, each signal representing variations in the sensed passage of the elements from the intended rate and due to a first component representing torsional oscillations and a second component representing false components due to errors in the sensing means by one of the two locations, said second signal including false components which are out-of-phase with false components of said first signal; and (c) electrically summing the first and second signals to eliminate the false components of frequencies $f_m$.

8. The method of claim 7 wherein said false components are of an integral multiplier of said rate of rotation.

9. The method of claim 8 wherein said integral multiplier is an odd multiple of an integer.

* * * * *